hydroxypropylmethyl cellulose described in Example 1A. The resulting clear 20% solution of the cellulose ether a viscosity of about 3,100 cps. at 22° C. Capsules were prepared from this non-aqueous solution using #0 stainless steel capsule-forming pins essentially as described in Example 1A. The resulting capsules had a uniform thickness of 3-4 mils. They were clear, moderately flexible, and strong enough to withstand normal handling under conditions of extreme humidity, yet dissolved readily in water.

(B) In a similar manner, clear capsules were prepared from a 15% solution of 5 cps. hydroxypropylmethyl cellulose in the 70/30 methylene chloride/methanol solvent having an operational viscosity of about 1,500 cps. However, a 25% solution with an operational viscosity of about 5,400 cps. gave poorer results in a manual dip coating operation at room temperature.

(C) Other water-soluble $C_2$–$C_4$ hydroxyalkyl methyl cellulose ethers having a 2 percent aqueous solution viscosity of 2–20 cps. at 20° C. and containing 4–15 weight percent hydroxyalkoxyl and 18–32 weight percent methoxyl groups can be used in this process wtih satisfactory results.

(D) As a rapid evaluation of several chlorinated solvent/alcohol systems, films were cast on glass plates using a 5–10% solution of 5 cps. Methocel 60 HG. The dried films were evaluated according to the following scale:

Description:   Rating
 Excellent—absolutely clear, free of gels or fibers, very smooth _____ 10
 Good—clear, a few gels or fibers, free of "orange peel" effect _____ 8
 Fairly good—slight haze, some "orange peel" effect _____ 7
 Fair—moderate haze, noticeable "orange peel" effect, slightly rough surface _____ 5
 Poor—very hazy, quite rough _____ 3
 Very poor—extremely hazy, very rough and brittle _____ 1
 Failure—very rough, too brittle to remove from plate _____ 0

Typical results from several solvent systems are given in Table 1. A rating of at least 5 and preferably 7–10 is desirable for a system to be used in preparing medicinal capsules.

TABLE 1.—SOLVENT SYSTEMS FOR 5 CPS. METHOCEL 60 HG

| Solvent System | Rating with Solvent Ratio¹ of— | | | |
|---|---|---|---|---|
|  | 80/20 | 70/30 | 60/40 | 50/50 |
| $CH_2Cl_2$/MeOH | 8 | 6 | 6 | 5 |
| $CH_2Cl_2$/EtOH | 7.5 | 7.5 | 7 | 5 |
| $CH_2Cl_2$/i-PrOH | 8 | 7 | 7 | 6.5 |
| $CHCl_3$/MeOH | 8 | 8 | 7 | 7 |
| $CHCl_3$/EtOH | 7.5 | 7.5 | 7 | 7 |
| $CHCl_3$/i-PrOH | 8 | 7.5 | 7 | 4.5 |

¹ Weight ratio chlorinated solvent/alcohol.

EXAMPLE 4

Capsule properties (A) To illustrate the physical properties of the cellulose ether capsules prepared from the hydroxyalkyl-cellulose ethers, films of several hydroxyalkylcellulose ethers were cast from aqueous alcohol on a glass plate by standard techniques. Among the hydroxyalkylcellulose ethers tested were 5 cps. Methocel 60 HG and 10 cps. Methocel 90 HG prepared by irradiation, and 15 cps. Methocel 60 HG prepared by conventional methods. Methocel 90 HG contains 4–12 percent hydroxypropoxyl and 19–24 percent methoxyl groups. For comparison films of Methocel MC containing 27.5–31.5 percent methoxyl groups and no hydroxyalkyl groups and a commercial gelatin film were also included in the tests. The cellulose ether films had a thickness of about 2.2 mils while the gelatin film was 3.7 mils.

Standard 2.5 x 15.0 cm. test strips were prepared from the test films. Tensile strengths were measured at room temperature and 25–30 percent relative humidity. The relative rates of dissolution at body temperature were measured by suspending the test strips in a water bath at 37±1° C. with a 0.5 g. weight clipped to the lower end. The time to failure was measured with a stop watch. Typical results are given in Table 2.

TABLE 2.—FILM PROPERTIES

| Film | Thickness (mil) | Elongation, percent | Tensile Strength (p.s.i.) | Solution rate, 37° C. (sec./mil) |
|---|---|---|---|---|
| Methocel 60 HG, 5 cps | 2.2 | 12–15 | 8.5–9.5×10³ | 7.5 |
| Methocel 60 HG, 15 cps | 2.2 | 12–15 | 9.0–9.6×10³ | 10.0 |
| Methocel 90 HG, 10 cps | 2.2 | 12–15 | 7.5–8.5×10³ | 15.8 |
| Methocel MC, 10 cps | 2.2 | 12–15 | 9.6–10.5×10³ | 25.4 |
| Gelatin | 3.7 | 4–7 | 10.5–11.5×10³ | 22.6 |

(B) In another test 4 mil capsules prepared on a commercial dip coating unit were filled with a mixture of sugar and a water-soluble yellow dye, immersed in 0.1 N HCl at 36.9° C., and the time for the solution to turn yellow measured as an indication of the capsule solubility. Typical results from triplicate runs are given in Table 3.

TABLE 3

Dissolution test

| Capsule material: | Dissolution time, min. |
|---|---|
| Gelatin | 1.25–1.5 |
| Hydroxypropylmethylcellulose ¹ | 1.5–2.25 |
| Methylcellulose ² | 25 |

¹ Methocel 60 HG.
² Methocel MC.

We claim:

1. In a process for preparing telescoping medicinal capsules by dip-coating a capsule-forming die, drying the coating to form a capsule member, and then assembling the capsule body and cap, the improvement which comprises using as the dip-coating bath a non-thermal gelling solution of:

(A) About 10–30 weight percent of a water soluble hydroxyalkylcellulose ether having a viscosity of about 2–20 cps. as a 2 percent aqueous solution at 20° C., said cellulose ether containing about 4–15 weight percent $C_2$–$C_4$ hydroxyalkoxyl groups and 18–32 weight percent $C_1$–$C_2$ alkoxyl groups; and (B) A solvent consisting essentially of:
 (1) From 15–40 weight percent water and from 60–85 weight percent of a $C_1$–$C_3$ alcohol; or
 (2) A non-aqueous mixture of from 15–50 weight percent of a $C_1$–$C_3$ alcohol, and from 85–50 weight percent of a $C_1$–$C_3$ chlorinated aliphatic hydrocarbon or a $C_6$–$C_7$ aromatic hydrocarbon, said mixture containing less than about 4 weight percent water;

said dip-coating solution having a viscosity of about 1,000–12,000 cps. at the dip-coating temperature.

2. The process of claim 1 wherein the water soluble hydroxyalkylcellulose has a viscosity of about 2–7 cps. as a 2 percent aqueous solution at 20° C.

3. The process of claim 1 wherein the cellulose ether contains about 4–15 weight percent hydroxypropoxyl and about 18–32 weight percent methoxyl groups.

4. The process of claim 1 wherein the cellulose ether contains 7–12 weight percent hydroxypropoxyl groups and 28–30 weight percent methoxyl groups.

5. The process of claim 1 wherein the alcohol is methanol.

6. The process of claim 1 wherein the solvent is a mixture of 15–40 weight percent water and 85–60 weight percent methanol.

7. The process of claim 1 wherein the chlorinated hydrocarbon is methylene chloride.

8. The process of claim 1 wherein the dip-coating bath is a solution of 20–30 weight percent of a hydroxypropylmethylcellulose, having a viscosity of about 2–7 cps. as a 2 percent aqueous solution at 20° C., in 60–85 percent aqueous methanol, said solution having an operational viscosity of about 1,000–12,000 cps. at a temperature between 20–50° C.

References Cited

UNITED STATES PATENTS

| | | | |
|---|---|---|---|
| 2,526,683 | 10/1950 | Murphy | 167—83 |
| 2,835,666 | 5/1958 | Savage | 106—197 |
| 2,836,506 | 5/1958 | Silvernail et al. | 106—197 |
| 2,839,419 | 6/1958 | Windover et al. | 106—197 |
| 2,849,328 | 8/1958 | Swinehart et al. | 106—197 |
| 3,278,521 | 10/1966 | Klug | 106—197 |

FOREIGN PATENTS 833,834  5/1960  Great Britain.

ALLAN LIEBERMAN, Primary Examiner

U.S. Cl. X.R.

106—197, 190, 170; 206—84; 220—8; 264—301; 424—35

3,493,407
PREPARATION OF MEDICINAL CAPSULES FROM HYDROXYALKYLCELLULOSE ETHERS
George K. Greminger, Jr., and Lewis E. Davis, Midland, Mich., assignors to The Dow Chemical Company, Midland, Mich., a corporation of Delaware
No Drawing. Continuation-in-part of applications Ser. No. 485,615 and Ser. No. 485,616, both Sept. 7, 1965. This application May 26, 1967, Ser. No. 641,457
Int. Cl. C08b 21/24; A61k 9/04
U.S. Cl. 106—189
8 Claims

ABSTRACT OF THE DISCLOSURE

Improved cellulose ether medicinal capsules are prepared by forming the capsules from a solution containing about 10–30 weight percent of a hydroxyalkylmethylcellulose and having an operational viscosity of about 1,000–12,000 cps.

---

This application is a continuation-in-part of applications Ser. No. 485,615 and 485,616, filed by G. K. Greminger and L. E. Davis on Sept. 7, 1965, and now abandoned.

BACKGROUND

Medicinal capsules have long been made of gelatin. In spite of the recognized deficiencies of gelatin capsules under conditions of low or high humidity and examination of many natural and synthetic polymers as a replacement, none have found significant commercial acceptance.

In U.S. Patent 2,526,683 Murphy describes the preparation of capsules from methylcellulose by a thermal gelation dip process. However, the clarity and rate of solution of these methylcellulose capsules in the alimentary tract were inadequate for commercial acceptance.

Highly plasticized water-soluble cellulose ether compositions suitable for molding or extrusion at 150°–170° C. are recommended by Silvernail U.S. Patent 2,602,755 for preparing flexible films or molded capsules. Such highly plasticized cellulose ether compositions were developed as indicated by Greminger and Weaver in U.S. Patent 2,810,659 because of the difficulties encountered in conventional casting and dipping operations from aqueous solution because of high viscosity and thermal gelation.

STATEMENT OF THE INVENTION

It has now been discovered that certain hydroxyalkylcellulose ethers characterized by a viscosity of 2–20 cps., and preferably 2–7 cps., as a 2% aqueous solution at 20° C., can be used to prepare a solution containing 10–30 weight percent, and preferably 20–30 weight percent of the cellulose ether from which suitable medicinal capsules can be obtained in a single dip coating operation. More specifically the hydroxyalkylcellulose ethers are water-soluble ethers containing about 4–15 weight percent of $C_2$–$C_4$ hydroxyalkoxyl and about 18–32 weight percent of $C_1$–$C_2$ alkoxyl groups.

Capsules can be formed from both aqueous and non-aqueous solutions of these low viscosity hydroxyalkylcellulose ethers with conventional equipment. The process is not dependent on thermal gelation and the capsules remain firm and sturdy under conditions of extreme humidity. Also, they can be heat sealed. Without requiring large amounts of plasticizer, they have both enhanced clarity and solution rate. Indeed under conditions such as encountered in the alimentary tract, the solution rate of these capsules is superior to prior methylcellulose capsules and comparable to standard gelatin capsules.

HYDROXYALKYLCELLULOSE ETHERS

Essential is a low viscosity, water-soluble $C_2$–$C_4$ hydroxyalkylcellulose ether such as hydroxypropylmethylcellulose, hydroxybutylmethylcellulose and hydroxyethylethylcellulose. Particularly effective is a low viscosity, water soluble hydroxypropylmethylcellulose with a 2-hydroxypropoxyl content of about 4–15 weight percent and a methoxyl content of about 18–32 weight percent. Other $C_2$–$C_4$ hydroxyalkylcellulose ethers containing about 0.15–0.30 hydroxyalkyl and 1.6–1.8 alkyl groups per anhydroglucose units can be used.

To achieve a desired capsule wall thickness of about 4 mils in a single dip, the cellulose ether solution must contain about 10–30 and preferably 20–30 weight percent of the cellulose ether and have an operational viscosity within the range of about 1,000–12,000 cps. This requires a hydroxyalkylcellulose ether having a standard 2 percent aqueous viscosity at 20° C. of about 2–20 cps. and preferably about 2–7 cps. Such low viscosity hydroxyalkylcellulose ethers are now available by processes such as described by Beaver U.S. Patent 3,108,890.

AQUEOUS SOLVENTS

Of considerable importance in the present process is the solubility of these hydroxyalkylcellulose ethers in water and aqueous mixtures of $C_1$–$C_3$ alcohols which permits preparation and use at about room temperature of solutions containing up to about 30 weight percent of the cellulose ether. Since the capsule body is formed by drying of the dip coating on the capsule-forming pin, the preferred aqueous solvent is water or a volatile aqueous alcohol such as methanol, ethanol or isopropanol. Also the aqueous alcohol should contain at least 15 weight percent water and preferably 15–40 weight percent. With less than 15 weight percent water the capsules have poor tensile strength.

NON-AQUEOUS SOLVENTS

Alternately a non-aqueous solvent system consisting essentially of 15–50 weight percent of a $C_1$–$C_3$ alcohol and 85–50 weight percent of a $C_1$–$C_3$ chlorinated aliphatic hydrocarbon or a $C_6$–$C_7$ aromatic hydrocarbon can be used. To obtain rapid drying, a volatile solvent with each component having a boiling point between 30°–120° C. is preferred. Particularly suitable are methanol, isopropanol, methylene chloride, chloroform, carbon tetrachloride, ethylene dichloride, propylene dichloride, benzene and toluene. A minor amount of water such as occasionally present in the organic solvents can be tolerated, but the total water content should not exceed about 3–4 weight percent.

PROCESS CONDITIONS

Capsule bodies can be prepared from suitable aqueous or non-aqueous solutions of the hydroxyalkylcellulose ether using commercial gelatin dip coating capsule machines such as described in Murphy U.S. Patent 2,526,683. A capsule-forming die, generally having rigid stainless steel pins mounted on a supporting member and coated with a lubricant grease, Teflon, polyethylene or other similar material for easy release of the dried capsule part, is immersed in a substantially bubble-free, solution of the low viscosity hydroxyalkylcellulose ether. For proper operation the solution must have a viscosity of about 1,000–12,000 cps. at the operational temperature which conveniently is about room temperature. As the die is gradually withdrawn from the dip coating solution, the excess material drains off leaving a wet coating on the pin from which the capsule body is formed by evaporation of the solvent coating. Depending on the specific solvent used, drying may require 10–20 minutes or more at room temperature. More rapid drying can be obtained using a warm air oven and an elevated temperature suitable for the particular cellulose ether-solvent system. Finally the dried hydroxyalkylcellulose capsule body is removed from the capsule-forming die, trimmed and assembled into a complete medicinal capsule.

Of critical importance in forming medicinal coatings with automatic commercial dip coating units is the operational viscosity of the cellulose ether solution used in coating the capsule forming pins. Proper coating of the pins and drainage of excess solution requires an operational viscosity in the range from about 1,000–12,000 cps. at the operating temperature, normally about 20–50° C. Non-uniform coating and uneven run down are encountered with cellulose ether solutions which are either too thin or too viscous.

As noted above the molecular weight of the hydroxyalkylcellulose ether, as measured by the standard 2 percent aqueous viscosity at 20° C., and its solution concentration are important factors in controlling the operational viscosity. With the preferred 2–7 cps. hydroxyalkylmethyl cellulose ethers, 20–30 weight percent solutions can be prepared with operational viscosities ranging from about 2,000–12,000 cps. which yield capsules with a wall thickness of about 4 mils using a commercial dip coating unit.

Normally the finished capsules are relatively clear and transparent. However, if opaque capsules are desired, a minor amount of an inert, non-toxic pigment such as powdered charcoal or finely divided titanium dioxide can be incorporated in the coating composition. Likewise conventional non-toxic dyes and fillers can be added in minor amount. If increased flexibility is required, an appropriate plasticizer such as glycerine, propylene glycol or hydroxypropylglycerine can be included in moderate amount, e.g. 10–20 percent.

This process is particularly suited for preparing medicinal capsules which dissolve under conditions of use at a rate comparable to conventional gelatin capsules. However, the formulation can be modified by incorporation of a less water-soluble cellulose ether such as ethylcellulose if delayed release characteristics are desirable.

To illustrate further the present invention and its advantages, the following examples are given. Unless otherwise specified, all parts and percentages are by weight. Solution viscosities are determined by the method of ASTM D–1347–64.

EXAMPLE 1

Aqueous alcohol systems (A) To 800 parts of 80 percent aqueous methanol was added 200 parts of Methocel 60 HG, 5 cps. This hydroxypropylmethylcellulose from The Dow Chemical Company contains 7–12 weight percent 2-hydroxypropoxyl and 28–30 weight percent methoxyl groups. It has a 2 percent aqueous solution viscosity of 5 cps. at 20° C. and a thermal gel point of about 60° C. The mixture was stirred slowly at room temperature until the cellulose ether dissolved. The resulting clear 20 percent solution had a viscosity of about 3000–3500 cps. at room temperature, about 22° C.

Capsules were prepared from this aqueous solution using #0 capsule-forming pins machined from type 316 stainless steel and lightly coated with a cottonseed oil lubricant grease. The pins were dipped into the hydroxypropylmethylcellulose solution at room temperature for several seconds and then were slowly withdrawn. The excess solution stripped from the coated pins as they were withdrawn. Then the coated pins were slowly revolved about the median horizontal axis of the supporting member for 10–15 minutes at room temperature until sufficient solvent evaporated to leave a clear, non-flowing film on the pins. The pins were transferred to a warm air oven and dried at 35°–40° C. for an additional 20–40 minutes.

After cooling the dried capsule pieces were stripped from the stainless steel pins and trimmed to the desired size. They had a uniform thickness of 3–4 mils. They were clear, moderately flexible, and strong enough to withstand normal handling, yet dissolved readily in water.

(B) In another test, clear capsules were prepared from a 20 percent solution of Methocel 60 HG, 5 cps., in 70 percent aqueous methanol. This aqueous methanol solution had an operational viscosity of about 4300 cps. at 22° C.

(C) Similar results have been obtained with aqueous isopropanol and other $C_1$–$C_3$ alcohols can be used. For maximum concentration of the hydroxypropyl methylcellulose in these solvents, the aqueous alcohol should contain from about 60–85 percent alcohol and 40–15 percent water. With an aqueous alcohol containing less than about 60 percent alcohol, the cellulose ether content generally must be reduced to keep the operational viscosity within acceptable limits.

(D) In further work, a Colton C–4 capsule machine equipped with No. 3 pins and used commercially to prepare gelatin capsules was used with several lots of hydroxypropylmethyl cellulose. No significant modification of the equipment was required to use an aqueous methanol solution of the cellulose ether. Uniformly good capsule bodies and caps were made and joined on a continuous basis using a 25 percent solution in 70% aqueous methanol of a hydroxypropylmethyl cellulose (Methocel 60 HG) which had a standard 2% viscosity of 4.0 cps. and an operational viscosity of about 6,000–9,000 cps. The capsules had a uniform wall thickness of about 3.8–4.3 mils.

A 26% solution of the same cellulose ether had an operational viscosity of about 11,600 cps. and gave capsules with a wall thickness of about 4.2–4.4 mils. A slight run down was evident with the 11,600 cps. solution, but not enough to prevent satisfactory joining of the capsule parts. With a 22% solution and an operational viscosity of about 3,500 cps., more serious run down was encountered although satisfactory capsules with wall thicknesses of 3.8–4.1 mils were obtained.

Another lot of the hydroxypropylmethyl cellulose which had a standard 2% viscosity of 4.7 cps., a 25% solution in 70% aqueous methanol had a viscosity at operating temperature of about 16,500 cps. Suitable capsules could not be made because severe run down during drying until the operational viscosity was reduced below about 12,000 cps. by increasing the operational temperature or decreasing the cellulose ether concentration.

EXAMPLE 2

Aqueous system

Following the general procedure described in Example 1A, capsules were prepared from a 20 percent solution of Methocel 60 HG, 5 cps., in water having an operational viscosity of about 2000–2500 cps. at 22° C. The coated pins were rotated at room temperature for 30–45 minutes prior to drying in the warm air oven at 35°–40° C. for 30–60 minutes. The dried capsules were in appearance and properties essentially the same as the capsules prepared from aqueous methanol solution.

EXAMPLE 3

Non-aqueous systems (A) To a solution of 700 parts methylene chloride and 300 parts methanol was added 240 parts of the 5 cps.